(12) United States Patent
Tikhomirov et al.

(10) Patent No.: US 7,848,380 B2
(45) Date of Patent: Dec. 7, 2010

(54) METHOD AND APPARATUS FOR MODIFYING OUT OF BAND REFLECTION FOR A LASER ELEMENT

(75) Inventors: Alexei Tikhomirov, Edinburgh (AU); Scott Foster, Edinburgh (AU)

(73) Assignee: The Commonwealth of Australia, Edinburgh, South Australia (AU)

( * ) Notice: Subject to any disclaimer, the term of this patent is extended or adjusted under 35 U.S.C. 154(b) by 309 days.

(21) Appl. No.: 11/791,645

(22) PCT Filed: Nov. 25, 2005

(86) PCT No.: PCT/AU2005/001784

§ 371 (c)(1),
(2), (4) Date: Feb. 26, 2008

(87) PCT Pub. No.: WO2006/056016

PCT Pub. Date: Jun. 1, 2006

(65) Prior Publication Data

US 2008/0259985 A1   Oct. 23, 2008

(30) Foreign Application Priority Data

Nov. 26, 2004   (AU) ............................. 2004906741

(51) Int. Cl.
*H01S 3/08*   (2006.01)
*H01S 3/13*   (2006.01)
(52) U.S. Cl. ................. 372/96; 372/29.02; 372/29.023; 372/92
(58) Field of Classification Search .................. 372/96, 372/92, 29.02, 29.023
See application file for complete search history.

(56) References Cited

U.S. PATENT DOCUMENTS

| 5,357,538 A |   | 10/1994 | Talneau et al. |
| 5,668,900 A | * | 9/1997 | Little et al. ................... 385/37 |
| 5,710,849 A | * | 1/1998 | Little et al. ................... 385/50 |

(Continued)

FOREIGN PATENT DOCUMENTS

JP   9-307179   11/1997

(Continued)

OTHER PUBLICATIONS

Hillmer, et al., "Continuously distributed phase shifts by chirped distributed-feedback gratings for 1.55μm distributed-feedback lasers", IEE Proc.-Optoelectron, Aug. 1997, pp. 256-260, vol. 144, No. 4, IEE.

(Continued)

*Primary Examiner*—Minsun Harvey
*Assistant Examiner*—Phillip Nguyen
(74) *Attorney, Agent, or Firm*—McDermott Will & Emery LLP (57) ABSTRACT

A method and apparatus for modifying the out of band reflection of a laser element is described. The laser element includes an active medium excited by optical pumping means to produce stimulation emission of light. The laser element further includes a Bragg grating structure for providing optical feedback for the active medium, with the Bragg grating structure including a phase transition region providing a change in phase. The change in phase of the phase transition region is adjusted to modify out of band reflection of said laser element.

14 Claims, 5 Drawing Sheets

U.S. PATENT DOCUMENTS

| | | | |
|---|---|---|---|
| 5,771,251 A * | 6/1998 | Kringlebotn et al. | 372/6 |
| 6,608,855 B1 | 8/2003 | Hwang et al. | |
| 6,638,773 B1 | 10/2003 | Hwang et al. | |
| 6,693,923 B2 * | 2/2004 | Kringlebotn et al. | 372/6 |
| 6,776,045 B2 * | 8/2004 | Fernald et al. | 73/705 |
| 2002/0076156 A1 * | 6/2002 | Kringlebotn et al. | 385/37 |
| 2003/0138206 A1 * | 7/2003 | Sheng et al. | 385/37 |
| 2004/0093950 A1 * | 5/2004 | Bohnert | 73/705 |
| 2005/0063430 A1 * | 3/2005 | Doucet et al. | 372/23 |
| 2008/0317420 A1 * | 12/2008 | Putnam et al. | 385/123 |

FOREIGN PATENT DOCUMENTS

| WO | WO-95-31020 | 11/1995 |
|---|---|---|

OTHER PUBLICATIONS

Løvseth, et al., "Analysis of Multiple Wavelength DFB Fiber Lasers", IEEE Journal of Quantum Electronics, Jun. 2001, pp. 770-780, vol. 37, No. 6, IEEE.

Sejka, et al., "Distributed feedback $Er^{3+}$-doped fibre laser", Electronic Letters, Aug. 17, 1995, pp. 1445-1446, vol. 31, No. 17, IEE.

Stepanov et al., "Apodized Distributed-Feedback Fiber Laser," Optical Fiber Technology, (1999) pp. 209-214, vol. 5, Academic Press.

Yelen et al., "A New Design Approach for Fiber DFB Lasers With Improved Efficiency," IEEE Journal of Quantum Electronics, Jun. 2004, pp. 711-720, vol. 40, No. 6, IEEE.

* cited by examiner

Figure 1

(PRIOR ART)

Figure 2

(PRIOR ART)

*Figure 3*

(PRIOR ART)

METHOD AND APPARATUS FOR MODIFYING OUT OF BAND REFLECTION FOR A LASER ELEMENT

CROSS REFERENCE TO RELATED APPLICATION

This application is a National Stage applicaton of International Application No. PCT/AU2005/001784, with and international filing date of Nov. 25, 2005.

FIELD OF THE INVENTION

The present invention relates to lasers. In one particular form the present invention relates to a distributed feedback (DFB) fibre laser having improved characteristics for use in fibre laser arrays.

BACKGROUND OF THE INVENTION

DFB lasers are a variety of lasers which include one or more Bragg gratings which act as reflection elements within a laser active region. This technique of co-locating the gain medium and the feedback grating is applicable to fibre lasers such as those which employ a gain medium that has been doped with erbium.

Figures 1, 2:
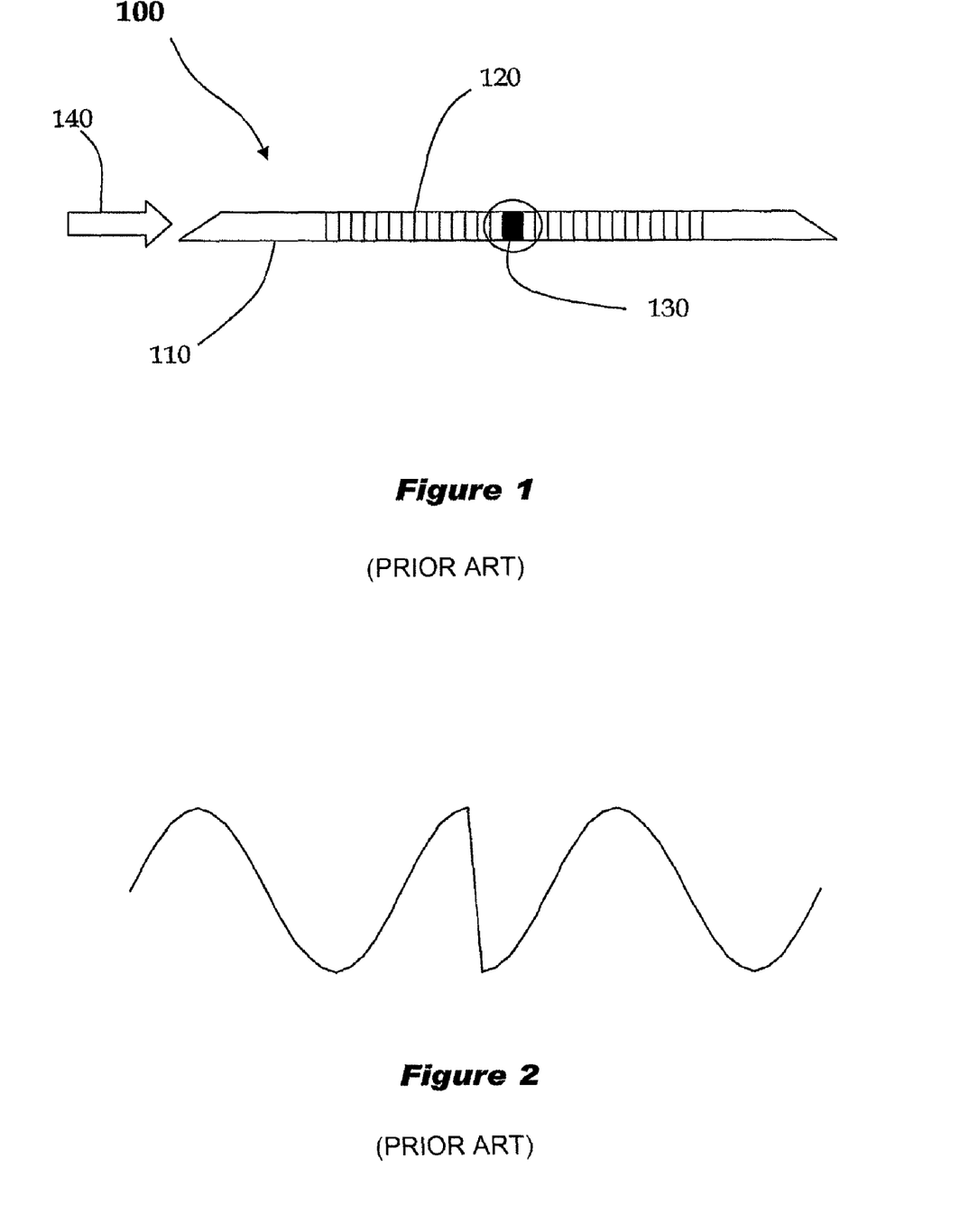
FIG. 1 is a figurative representation of a distributed feedback (DFB) fibre laser (FL) as known in the prior art.
FIG. 2 is a depiction of the $\pi$ phase shift introduced in the central lasing region of the DFB FL illustrated in FIG. 1.

An example of a prior art DFB fibre laser is illustrated in FIG. 1. Fibre laser 100 includes a doped fibre 110 and Bragg grating 120 incorporating a phase discontinuity located in the middle section 130 of grating 120. The Bragg grating is provided by a UV induced periodic spatial variation of the refractive index of the gain medium. Other techniques which provide a Bragg grating structure include periodic modulation of the gain or loss of the active region or potentially the cutting of a periodic pattern of grooves into the cladding of the fibre might also conceivably be used.

Fibre laser 100 is activated by optical pumping 140 which involves pumping light having a wavelength that matches with the appropriate absorption band of the active material or gain medium through a passive fibre connected to fibre laser 100. This arrangement of the Bragg grating 120 and gain medium provides optical feedback at approximately the Bragg wavelength $\lambda_B$ characterised by the relation $\lambda_B = 2n_{eff}\Lambda$ where $\Lambda$ is the period of the grating and $n_{eff}$ is the effective refractive index of the fibre mode.

The grating is characterised by a complex coupling coefficient $\kappa(z) = \pi\Delta n(z)e^{-i\phi(z)}/\lambda$ where $\Delta n$ is the refractive index modulation and $\phi(z)$ is the phase error associated with the grating and where z is a measure of the longitudinal distance along the fibre. Accordingly the spectral width of the grating reflection is proportional to $|\kappa|$.

Figure 3:
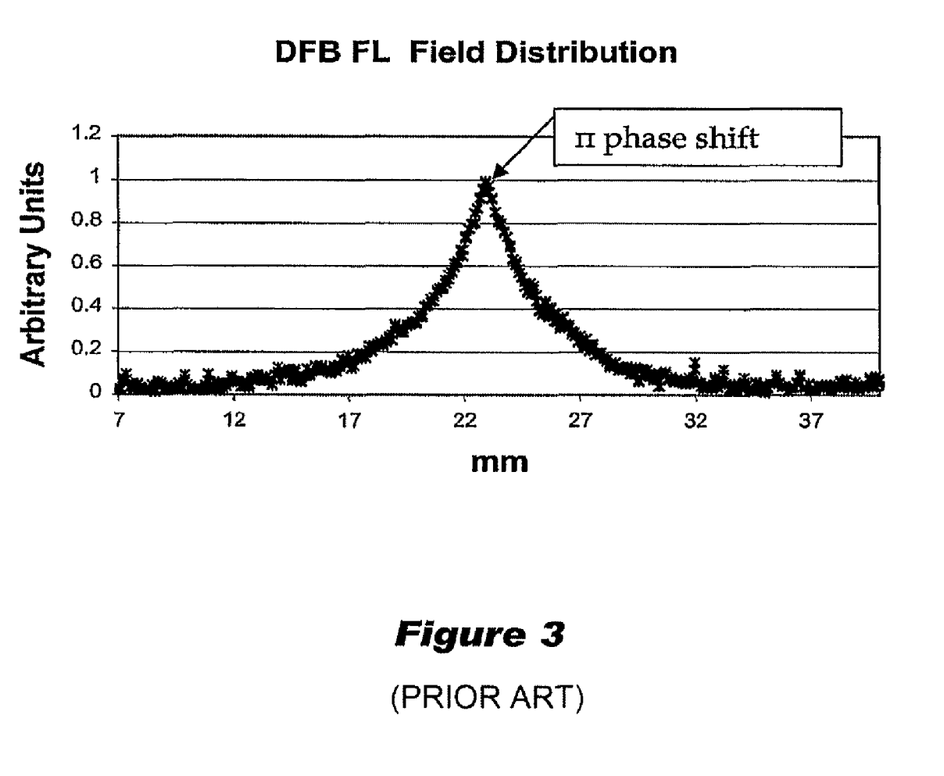
FIG. 3 is an example plot of the field distribution of the DFB FL as illustrated in FIG. 1.

As illustrated figuratively in FIG. 2, a $\pi$ phase shift is introduced into the middle section 130 of grating 120. The introduction of this phase shift ensures a lowest threshold, highly confined fundamental laser mode operating at essentially the Bragg wavelength $\lambda_B$. The typical field distribution of such a laser is shown in FIG. 3 where it can be seen that the field has a maximum at the location of the phase shift and decays exponentially away from the centre of grating 120. The spatial width of the field distribution depends on $|\kappa|$ and defines the overall device length L which in practice is usually a few centimeters.

One of the major applications of a DFB fibre laser is to incorporate a number of fibre lasers into one continuous fibre to form a fibre laser array. Each of the fibre lasers are tuned to operate at slightly different wavelengths $\lambda_{B_1}$, $\lambda_{B_2}$ etc with the advantage that optical pumping at a single wavelength may be employed to cause each of the DFB fibre laser sections to lase. This provides a means for wave division multiplexing as laser emissions from each fibre laser section travel down the common fibre and may be sampled using interferometric processing downstream.

Arrays of DFB fibre lasers of this type have been employed in a number of applications including sensor arrays where the wavelength output of each fibre laser varies according to the local value of a physical characteristic of the environment such as the temperature or level of sound, to uses such as multi-wavelength laser sources. Clearly, the ability of each fibre laser section to emit light essentially at the respective Bragg wavelength is critical as each of the wavelengths $\lambda_{B_1}$, $\lambda_{B_2}$ etc. will be tightly spaced due to the finite emission bandwidth available to the gain medium, which must be similar for each laser due to the requirement that each fibre laser is activated by pump light having the same wavelength.

However, DFB fibre lasers have a number of disadvantages which directly affect the performance of fibre laser arrays based on a number of fibre laser sections. Although the Bragg grating is designed to reflect light in only a narrow band about the Bragg wavelength $\lambda_B$ and to be essentially transparent outside the band there is in practice out of band reflection associated with the side-lobes of the Bragg grating.

The out of band reflection $r(v)$ is characterised by the relationship, $$r(v) = -\int_0^L \kappa(z) \cdot \exp(-i2\pi v z)\, dz$$

where $v$ is the detuning from the Bragg frequency and is defined by $$v = 2n_{eff} \cdot \left[\frac{1}{\lambda} - \frac{1}{\lambda_B}\right]$$

for $v > |\kappa|$. When two or more DFB fibre lasers are connected to the same fibre, this out of band reflection results in a fraction of light from a given fibre laser section being reflected by another fibre laser section thereby causing a shift $\Delta\lambda$ from the Bragg wavelength $\lambda_B$ for that particular fibre laser section.

For distance d between each fibre laser section this wavelength shift is approximated by $$\Delta\lambda = \lambda_B^2 \kappa |r| e^{-\kappa L} \sin(2\pi d/\lambda_B - \phi_r)/\pi$$

where $\phi_r$ is the phase of the out of band reflection $r(v)$ (i.e. $r(v) = |r|e^{i\phi_r}$) from the adjacent laser. Accordingly, the laser wavelength will be sensitive to both small changes in distance d between the fibre laser sections and the reflection coefficient $r(v)$ from the adjacent lasers. Clearly, this is undesirable in the example of a sensor array as the intent is to measure changes to the laser wavelength caused by local changes to the Bragg wavelength of the grating of the respective fibre laser section.

To address this issue of undesirable wavelength sensitivity, the physical length L of the grating structure can be increased. However, this has the obvious disadvantage of lengthening the fibre laser array where compactness is often a major requirement. In addition where the fibre laser sections are being employed in a sensor array such as an acoustic sensor, lengthening of each fibre laser section implies that a sample is taken from a distributed region as opposed to the fibre laser section acting as a point sensor. Often a sensor design will also require multiple point sensors in close proximity and lengthening the grating structure for each fibre laser section can greatly add to the mechanical constraints in dealing with such a sensor array.

It is an object of the invention to provide a DFB laser having improved characteristics that enable the incorporation of these devices into multiple DFB laser arrangements.

SUMMARY OF THE INVENTION

In a first aspect the present invention accordingly provides a laser element for producing laser light including:
  an active medium excited by optical pumping means to produce stimulated emission of light; and
  a Bragg grating structure for providing optical feedback for said active medium, said Bragg grating structure including a phase transition region providing a change in phase, wherein said change in phase of said phase transition region is adjusted to modify out of band reflection of said laser element.

By modifying the out of band reflection characteristics of the laser element the laser element may be customised for incorporation into a system incorporating an array of multiple laser elements.

Preferably, said change in phase is adjusted to reduce out of band reflection of said laser element.

Preferably, said change in phase is adjusted to continuously change over an extended region of said laser element.

Preferably, a maximum phase change $\Delta\Phi$ of said change in phase is greater than $\pi$.

Preferably, said maximum phase change $\Delta\Phi$ of said change in phase is determined in part by a length of said extended region.

Preferably, said maximum phase change $\Delta\Phi$ increases as said length of said extended region increases.

Preferably, said change in phase is characterized by a function $\phi(z) = f_1(z)\Delta\Phi$ where z is the length along the laser element and $f_1(z)$ is a function that varies smoothly from 0 to 1.

Preferably, said maximum phase change $\Delta\Phi$ is determined by solving the coupled equations for $\Delta\Phi$ and auxiliary function q(z):

$$\Delta\Phi = \pi + 2\int_{z_2}^{z_3} \kappa(z)\sin(q(z))\,dz$$

$$q(z) = \Delta\Phi f_1(z) - 2\int_{z_2}^{z} \kappa(z')\sin(q(z'))\,dz'$$

where $\kappa(z)$ is a coupling coefficient of said Bragg grating structure; and
  $z_2$ and $z_3$ define the boundaries of said phase transition region.

Optionally, said maximum phase change $\Delta\Phi$ of said smooth change in phase is determined by $$\Delta\Phi - 2\cdot\int_{z_2}^{z_3} \kappa(z)\cdot\sin(\Delta\Phi)\,dz = \pi$$

where $\kappa(z)$ is a coupling coefficient of said Bragg grating structure; and
  $z_2$ and $z_3$ define the boundaries of said phase transition region.

Preferably, said laser element is a distributed feedback (DFB) fibre laser (FL)

In a second aspect the present invention accordingly provides a method for producing laser light from a laser element, said method including the steps:
  optically pumping an active medium to produce stimulation emission of light; and
  adjusting a change in phase of a phase transition region of a Bragg grating structure providing optical feedback for said active medium to modify out of band reflection of said laser element.

BRIEF DESCRIPTION OF THE DRAWINGS

A preferred embodiment of the present invention will be discussed with reference to the accompanying drawings wherein.

DESCRIPTION OF PREFERRED EMBODIMENT

Figure 4:
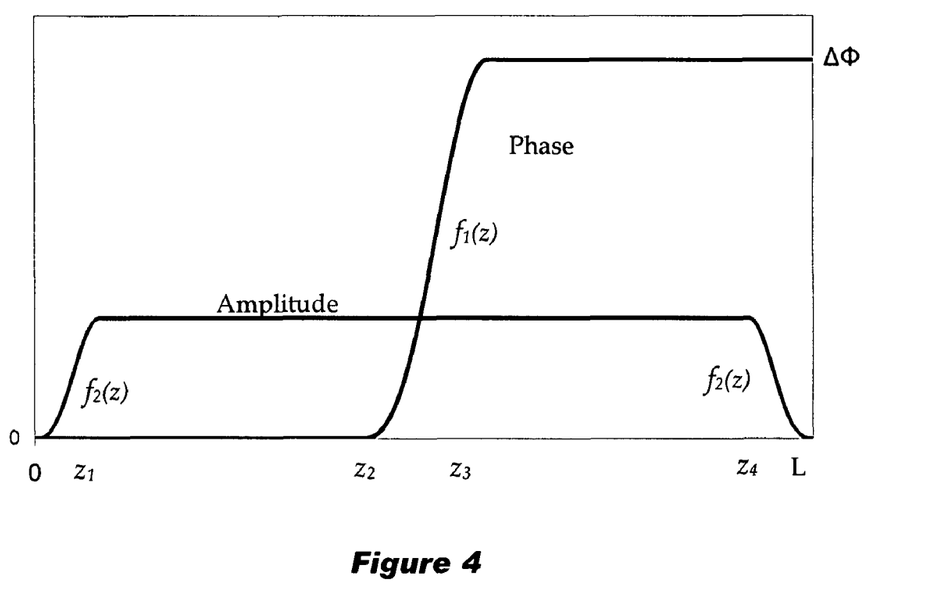
FIG. 4 is a plot of the amplitude and phase apodisation profiles according to a preferred embodiment of the present invention.

Referring now to FIG. 4, there is shown a modification of a phase transition region of a distributed feedback fibre laser (hereinafter a DFB FL) according to a preferred embodiment of the present invention. Whilst in this preferred embodiment the phase transition region of a DFB FL has been modified, it would be apparent to those skilled in the art that the invention may be equally applied to modify the out of band reflection characteristics of other varieties of Bragg grating lasers which incorporate central phase transition regions where the phase rapidly varies.

DFB FL is assumed to be of length L and is divided into five regions corresponding to first region ranging from $0 < z < z_1$, second region $z_1 < z < z_2$, third region $z_2 < z < z_3$, fourth region $z_3 < z < z_4$ and fifth region $z_4 < z < L$ where z measures longitudinal extent along the fibre. Apodisation is applied to both the amplitude and phase of the grating coupling coefficient $\kappa(z)$.

Phase apodisation is applied to the third region which would typically be a step function in a prior art DFB FL such as that illustrated in FIG. 1. According to this preferred embodiment of the present invention, a continuous phase transition $\phi(z)$ is introduced which is defined by the relationship $\phi(z) = f_1(z)\Delta\Phi$ with the boundary conditions $f_1(z_2) = 0$ and $f_1(z_3) = 1$.

In this embodiment $f_1(z)$ is chosen to achieve best reflection suppression on the defined transmission length $z_3-z_2$ and is defined by $$f_1(z) = \cos^n\left(\frac{\pi z}{2(z_3-z_2)} - \frac{\pi}{2(z_3-z_2)}\right)$$

for n=2, 4, etc. Depending on the apodisation requirements, other suitably defined smooth transition functions which vary from 0 to 1 and whose derivatives vanish at the relevant boundaries may be employed.

The value for the constant $\Delta\Phi$ is determined by solving numerically the following coupled equations thereby determining the value of $\Delta\Phi$ that ensures optimal single mode performance at the Bragg frequency.

$$\Delta\Phi = \pi + 2\int_{z_2}^{z_3} \kappa(z)\sin(q(z))\,dz$$

$$q(z) = \Delta\Phi f_1(z) - 2\int_{z_2}^{z} \kappa(z')\sin(q(z'))\,dz'$$

For the derivation of these equations see in particular Equation 19 as described in the article entitled "Experimental and Theoretical Characterisation of the Mode Profile of Single-Mode DFB Fiber Lasers" (IEEE Journal of Quantum Electronics, Vol. 41, No. 6, June 2005) which is herein incorporated by reference in its entirety. These coupled equations are then solved iteratively for $\Delta\Phi$ for reasonable choices of $f_1(z)$ such as that described above.

In certain cases where $\Delta\Phi$ is close to $\pi$, then the first order approximation $$\Delta\Phi - 2\cdot\int_{z_2}^{z_3} \kappa(z)\cdot\sin(\Delta\Phi f_1(z))\,dz = \pi$$

may be adequate. Whilst in this preferred embodiment $\Delta\Phi$, has been calculated according to the above relationships, clearly other values may be calculated and used according to the exact tuning requirements of the DFB FL being contemplated.

According to these calculations, the phase shift step value or maximum phase change $\Delta\Phi$ will always be greater than $\pi$. As would be appreciated by those skilled in the art, for prior art DFB FLs the optimal condition for single mode performance whereby the optimum amount of energy is confined in one mode has always incorporated a phase shift step value or maximum phase change of $\pi$.

Additionally the amplitude $|\kappa(z)|$ of grating coupling coefficient may also be modified. Referring again to FIG. 4, $|\kappa(z)|$ is modified according to the relationship $|\kappa(z)|=f_2(z)\cdot|\kappa_0|$ where $f_2(0)=f_2(L)=0$ and $f_2(z)=1$ for $z_1<z<z_4$. For first and fifth regions $f_2(z)$ is defined in a similar manner to $f_1(z)$. Whilst amplitude apodisation of this nature is known in the prior art it does not in of itself successfully address issues with out of band reflection as highlighted previously. However, it may be employed in addition to phase apodisation according to the present invention to further reduce the effects of side lobes thereby resulting in minimised out of band reflection in a fibre laser section.

Figure 5:
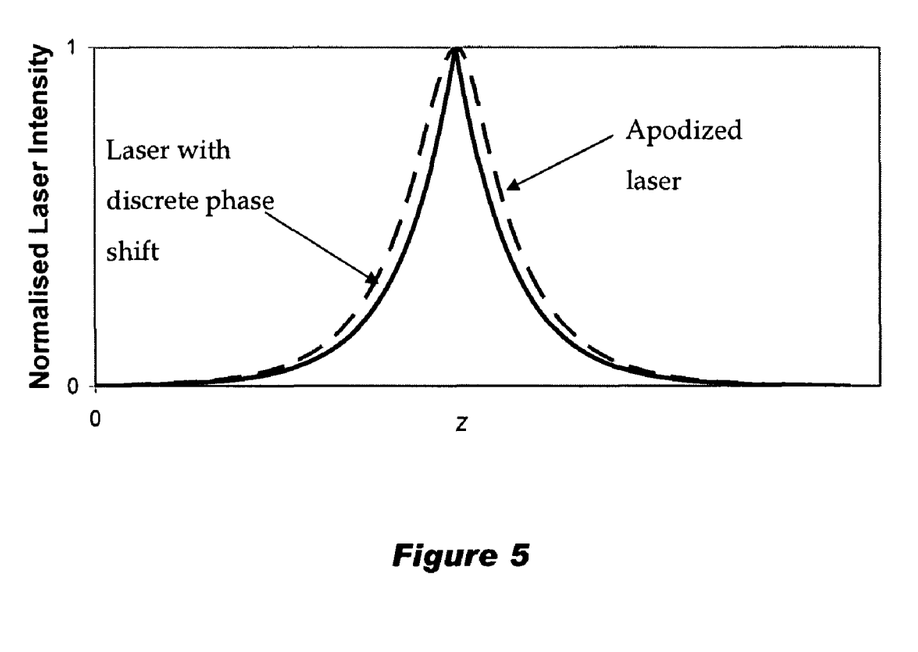
FIG. 5 is a plot of the field distribution of an apodised DFB FL laser when modified according to the apodisation profiles illustrated in FIG. 4 compared to the field distribution of standard DFB FL.

Referring now to FIG. 5, a calculated curve for the field distribution of a DFB FL which has been apodised according to the present invention is compared with the field distribution of a corresponding standard DFB FL. For this embodiment, the region $z_3-z_2$ corresponds to 0.2 L. Although the phase shift region has now extended in size to occupy approximately 20% of the device length, the associated increase in the laser mode width and hence overall device length is only 4% and as such only represents a very small increase.

Figure 6:
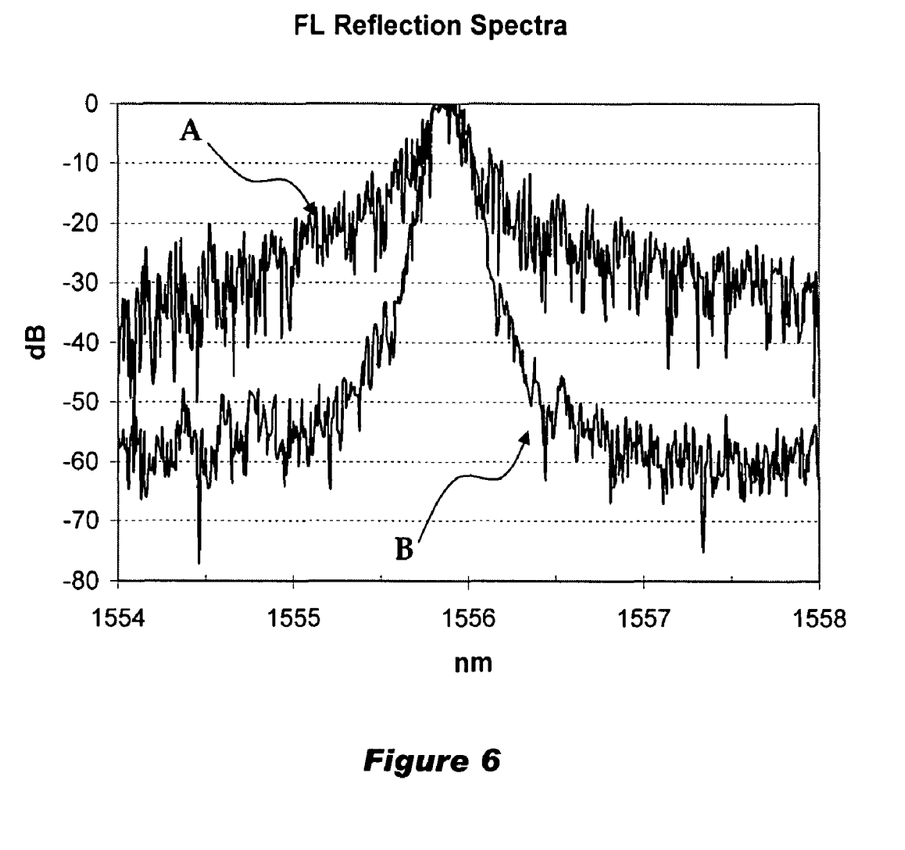
FIG. 6 is a comparison plot of the measured spectral reflection curve of a non-apodised and apodised DFB FL modified according to the apodisation profiles illustrated in FIG. 4.

Referring now to FIG. 6, plot B depicts the measured spectral reflection curve from a DFB FL apodised according to the present invention and employing parameters $\kappa_0=1.9$ cm$^{-1}$ and $\Delta\Phi=4.5$ radians thereby illustrating that reflection values of less than −50 dB are achievable. For comparison, plot A depicts the spectral reflection curve for a non-apodised laser of the prior art.

Accordingly, this invention makes it possible to achieve very low out of band reflectivity without having to substantially increase the total device length thereby making DFB FLs adopting this invention most suitable for incorporation in linear multiplexed fibre laser arrays. The invention partly resides in realising that scattering from the normal discrete $\pi$ phase shift employed in standard DFB FL contributes substantially to the spectral reflection curve. According to the present invention, adjusting and modifying the shape and/or associated magnitude of this phase shift is important when attempting to substantially reduce the out of band spectral reflection.

Although a preferred embodiment of the present invention has been described in the foregoing detailed description, it will be understood that the invention is not limited to the embodiment disclosed, but is capable of numerous rearrangements, modifications and substitutions without departing from the scope of the invention as set forth and defined by the following claims.

The invention claimed is:

1. A distributed feedback fiber laser element for producing laser light including:
   an active medium excited by optical pumping means to produce stimulated emission of light; and
   a Bragg grating structure for providing optical feedback for said active medium in a wavelength band, said Bragg grating structure including a phase transition region providing a change in phase, wherein said change in phase of said phase transition region of the Bragg grating structure is adjusted to continuously change over an extended region of said laser element to reduce out of band reflection associated with side lobes of the Bragg grating structure to reduce a fraction of light reflected by the Bragg grating structure outside of the wavelength band of said laser element.

2. A laser element for producing laser light as claimed in claim 1, wherein a maximum phase change $\Delta\Phi$ of said change in phase is greater than $\pi$.

3. A laser element for producing laser light as claimed in claim 2, wherein said maximum phase change $\Delta\Phi$ of said change in phase is determined in part by a length of said extended region.

4. A laser element for producing laser light as claimed in claim 3, wherein said maximum phase change $\Delta\Phi$ increases as said length of said extended region increases.

5. A laser element for producing laser light as claimed in claim 1, wherein said change in phase is characterized by a function $\phi(z)=f_1(z)\Delta\Phi$ where z is the length along the laser element and $f_1(z)$ is a function that varies smoothly from 0 to 1.

6. A laser element for producing laser light as claimed in claim 5, wherein said maximum phase change $\Delta\Phi$ is determined by solving the coupled equations for $\Delta\Phi$ and auxiliary function q(z):

$$\Delta\Phi = \pi + 2\int_{z_2}^{z_3} \kappa(z)\sin(q(z))\,dz$$

$$q(z) = \Delta\Phi f_1(z) - 2\int_{z_2}^{z} \kappa(z')\sin(q(z'))\,dz'$$

where $\kappa(z)$ is a coupling coefficient of said Bragg grating structure; and $z_2$ and $z_3$ define the boundaries of said phase transition region.

7. A laser element for producing laser light as claimed in claim 5, wherein said maximum phase change $\Delta\Phi$ of said smooth change in phase is determined by $$\Delta\Phi - 2\cdot\int_{z_2}^{z_3} \kappa(z)\cdot\sin(\Delta\Phi)\,dz = \pi$$

where $\kappa(z)$ is a coupling coefficient of said Bragg grating structure; and $z_2$ and $z_3$ define the boundaries of said phase transition region.

8. A method for producing laser light from a distributed feedback fiber laser element, said method including the steps:

optically pumping an active medium to produce stimulation emission of laser light; and adjusting a change in phase of a phase transition region, continuously over an extended region of said laser element, of a Bragg grating structure providing optical feedback for said active medium in a wavelength band to reduce out of band reflection associated with side lobes of the Bragg grating structure to reduce a fraction of light reflected by the Bragg grating structure outside of the wavelength band of said laser element.

9. A method for producing laser light from a laser element as claimed in claim 8, wherein a maximum phase change $\Delta\Phi$ of said change in phase is greater than $\pi$.

10. A method for producing laser light from a laser element as claimed in claim 9, wherein said maximum phase change $\Delta\Phi$ of said change in phase is determined in part by a length of said extended region.

11. A method for producing laser light from a laser element as claimed in claim 10, wherein said maximum phase change $\Delta\Phi$ increases as said length of said extended region increases.

12. A method for producing laser light from a laser element as claimed in claim 8, wherein said change in phase is characterized by a function $\phi(z)=f_1(z)\Delta\Phi$ where z is the length along the laser element and $f_1(z)$ is a function that varies smoothly from 0 to 1.

13. A method for producing laser light from a laser element as claimed in claim 12, said method further including the step of determining said maximum phase change $\Delta\Phi$ by solving the coupled equations for $\Delta\Phi$ and auxiliary function q(z):

$$\Delta\Phi = \pi + 2\int_{z_2}^{z_3} \kappa(z)\sin(q(z))\,dz$$

$$q(z) = \Delta\Phi f_1(z) - 2\int_{z_2}^{z} \kappa(z')\sin(q(z'))\,dz'$$

where $\kappa(z)$ is a coupling coefficient of said Bragg grating structure; and $z_2$ and $z_3$ define the boundaries of said phase transition region.

14. A method for producing laser light from a laser element as claimed in claim 12, said method further including the step of determining said maximum phase change $\Delta\Phi$ of said smooth change in phase by solving $$\Delta\Phi - 2\cdot\int_{z_2}^{z_3} \kappa(z)\cdot\sin(\Delta\Phi f_1(z))\,dz = \pi$$

where $\kappa(z)$ is a coupling coefficient of said Bragg grating structure; and $z_2$ and $z_3$ define the boundaries of said phase transition region.

* * * * *

UNITED STATES PATENT AND TRADEMARK OFFICE
CERTIFICATE OF CORRECTION

PATENT NO. : 7,848,380 B2
APPLICATION NO. : 11/791645
DATED : December 7, 2010
INVENTOR(S) : Alexei Tikhomirov et al.

Page 1 of 1

It is certified that error appears in the above-identified patent and that said Letters Patent is hereby corrected as shown below:

IN THE CLAIMS:

In Column 7, Line 23: Replace " $\Delta\Phi - 2 \cdot \int_{z_2}^{z_3} \kappa(z) \cdot \sin(\Delta\Phi) dz = \pi$ " with -- $\Delta\Phi - 2 \cdot \int_{z_2}^{z_3} \kappa(z) \cdot \sin(\Delta\Phi f_1(z)) dz = \pi$ --.

Signed and Sealed this
Thirteenth Day of September, 2011

David J. Kappos
*Director of the United States Patent and Trademark Office*